(12) United States Patent
Nishioka et al.

(10) Patent No.: US 10,612,450 B2
(45) Date of Patent: Apr. 7, 2020

(54) CONTROL DEVICE FOR VEHICLE

(71) Applicant: TOYOTA JIDOSHA KABUSHIKI KAISHA, Toyota-shi, Aichi-ken (JP)

(72) Inventors: Hideo Nishioka, Toyota (JP); Shuichi Morie, Toyota (JP); Yoichi Onishi, Okazaki (JP); Masafumi Nakamine, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/146,440

(22) Filed: Sep. 28, 2018

(65) Prior Publication Data

US 2019/0101045 A1 Apr. 4, 2019

(30) Foreign Application Priority Data

Oct. 4, 2017 (JP) .................................. 2017-194368

(51) Int. Cl.
| | |
|---|---|
| *G06F 7/00* | (2006.01) |
| *F01P 7/10* | (2006.01) |
| *B60K 11/08* | (2006.01) |
| *F01P 7/06* | (2006.01) |
| *F01P 11/10* | (2006.01) |
| *B60K 11/06* | (2006.01) |
| *B60R 22/00* | (2006.01) |
| *E05F 15/00* | (2015.01) |
| *G05D 1/00* | (2006.01) |
| *G05D 3/00* | (2006.01) |
| *G06F 17/00* | (2019.01) |

(52) U.S. Cl.
CPC ................ *F01P 7/10* (2013.01); *B60K 11/06* (2013.01); *B60K 11/085* (2013.01); *F01P 7/06* (2013.01); *F01P 11/10* (2013.01); *F01P 2050/22* (2013.01)

(58) Field of Classification Search
CPC . F01P 7/10; B60K 11/06; B60K 11/04; B60K 11/085
USPC ..................................................... 701/36, 49
See application file for complete search history.

(56) References Cited

U.S. PATENT DOCUMENTS

2013/0275009 A1 10/2013 Sakai
2014/0005896 A1* 1/2014 Hirota .................. B60K 11/085
  701/49

(Continued)

FOREIGN PATENT DOCUMENTS

| JP | 2012-121514 A | 6/2012 |
| JP | 2012-197001 A | 10/2012 |
| JP | 2017-132452 A | 8/2017 |

*Primary Examiner* — Mahmoud S Ismail
(74) *Attorney, Agent, or Firm* — Oliff PLC

(57) ABSTRACT

A control device for a vehicle includes a grille shutter ECU that is connected to a LIN communication line and controls driving of a grille shutter, and an engine ECU that is connected to the LIN communication line so as to be able to establish communication with the grille shutter ECU. In the case of detecting an abnormality in the communication, if a predetermine threshold time or more has elapsed since a start of the vehicle, and if cumulative time that a detection result of a vehicle speed sensor is equal to or more than a predetermined vehicle speed threshold value, is equal to or more than a cumulative threshold value, and a number of starts of the vehicle is equal to or more than a predetermined trip number, the engine ECU determines that the detected abnormality is a failure in the LIN communication.

4 Claims, 3 Drawing Sheets

(56) References Cited

U.S. PATENT DOCUMENTS

2017/0210221 A1    7/2017  Ogura et al.
2017/0334284 A1*  11/2017  Drozdowski ........... B60R 19/52

* cited by examiner

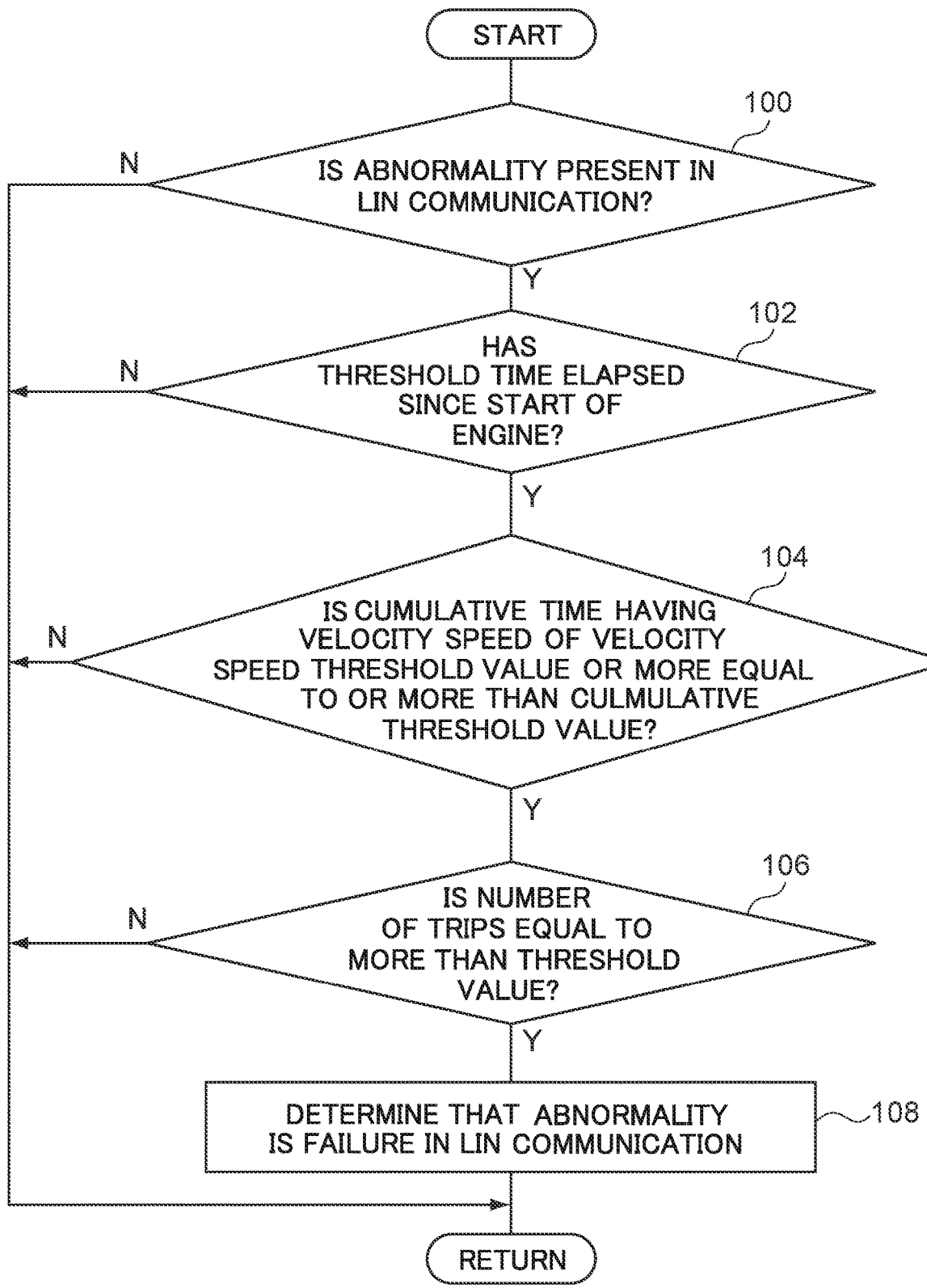

CONTROL DEVICE FOR VEHICLE

CROSS-REFERENCE TO RELATED APPLICATION

This application is based upon and claims the benefit of priority of the prior Japanese Patent Application No. 2017-194368, filed on Oct. 4, 2017, the entire content of which is incorporated herein by reference.

TECHNICAL FIELD

The present invention relates to a grille shutter control device that controls driving of a grille shutter provided at a front portion of a vehicle in an openable and closable manner.

RELATED ART

Japanese Patent Application Laid-Open No. 2012-121514 (Patent Document 1) proposes a grille shutter opening and closing control device including a grille shutter that opens and closes a grille opening portion to introduce air into an engine room; a shutter opening and closing operation means that has a drive source to operate opening and closing of the grille shutter; a closing operation determination means that determines whether or not to operate the grille shutter in a closing direction based on inputted vehicle information; and a drive source torque control means that, in a case where the closing operation determination means operates the grille shutter in the closing direction, if an engine is stopped, controls the drive source of the shutter opening and closing operation means so as to operate with a lower torque than a high torque applied in opening operation of the grille shutter. The technology of Patent Document 1 allows a reduction in operation noise of the grille shutter, while the engine is stopped.

In-vehicle equipment, such as a control unit for controlling a grille shutter, establishes communication by connection to in-vehicle communication lines. However, the technology of Patent Document 1 does not consider cases in which an abnormality occurs in the in-vehicle communication, thus being susceptible to improvement.

For example, in the cases of driving vehicles in noisy environments, e.g. in an airport, under high-voltage electric power lines, near a cellular base station, and the like, communication troubles owing to noise may be mistaken as communication failures.

SUMMARY

The present disclosure is implemented under the circumstances described above, and the present invention aims at providing a control device for a vehicle that can determine a communication failure with high reliability.

A first aspect includes a control unit connected to a communication line in a vehicle, the control unit controlling in-vehicle equipment; and a determination unit that is connected to the communication line and that is configured to establish communication with the control unit. In the case of detecting an abnormality in the communication, if at least one condition that: (i) a predetermine threshold time or more has elapsed since a start of the vehicle, or (ii) cumulative time, that a vehicle speed detected by a detection unit is equal to or more than a predetermined vehicle speed threshold value, is equal to or more than a cumulative threshold value, is satisfied, the determination unit determines that the detected abnormality is a failure in the communication.

According to the first aspect, the control unit is connected to the communication line in the vehicle and controls the in-vehicle equipment. For example, as described in a third aspect, the communication line may be a communication line for LIN communication. As described in a fourth aspect, the control unit may be a grille shutter control unit that controls opening and closing of a grille shutter to introduce air into a cooling target of the vehicle.

The determination unit is connected to the communication line so as to be able to establish communication with the control unit. In the case of detecting an abnormality in the communication, if at least one of the conditions that the predetermine threshold time or more has elapsed since a start of the vehicle, and a cumulative time that a vehicle speed detected by the detection unit is equal to or more than the predetermined vehicle speed threshold value is equal to or more than the cumulative threshold value is satisfied, the determination unit determines that the detected abnormality is a failure in the communication. In other words, satisfaction of at least one of the conditions corresponds to a condition for considering that the vehicle has already moved from a noisy environment. In a case where the condition is satisfied, if an abnormality is detected in the communication, the determined abnormality is not an abnormality owing to noise but is a failure in the communication. Therefore, the failure in the communication can be determined with high reliability.

A second aspect includes a control unit connected to a communication line in a vehicle, the control unit controlling in-vehicle equipment; and a determination unit that is connected to the communication line and that is configured to establish communication with the control unit. In the case of detecting an abnormality in the communication, if at least one condition that: (i) a predetermine threshold time or more has elapsed since a start of the vehicle, or (ii) cumulative time, that a vehicle speed detected by a detection unit is equal to or more than a predetermined vehicle speed threshold value, is equal to or more than a cumulative threshold value, is satisfied, and a number of starts of the vehicle is equal to or more than a predetermined threshold value, the determination unit determines that the detected abnormality is a failure in the communication.

According to the second aspect, the control unit is connected to the communication line in the vehicle and controls the in-vehicle equipment. For example, as described in a third aspect, the communication line may be a communication line for LIN communication. As described in a fourth aspect, the control unit may be a grille shutter control unit that controls opening and closing of a grille shutter to introduce air into a cooling target of the vehicle.

The determination unit is connected to the communication line and is configured to establish communication with the control unit. In the case of detecting an abnormality in the communication, if at least on condition that: (i) the predetermine threshold time or more has elapsed since a start of the vehicle, or (ii) cumulative time, that a vehicle speed detected by the detection unit is equal to or more than the predetermined vehicle speed threshold value, is equal to or more than the cumulative threshold value, is satisfied, and a number of starts of the vehicle is equal to or more than the predetermined threshold value, the determination unit determines that the detected abnormality is a failure in the communication. In other words, satisfaction of at least one of the conditions, as well as the number of starts of the vehicle is equal to or more than the predetermined threshold value, is a condition for considering that the vehicle has already moved from a noisy environment. In a case where the condition is satisfied, if an abnormality is detected in the communication, the determined abnormality is not an abnormality owing to noise but is a failure in the communication. Therefore, the failure in the communication can be determined with high reliability.

As described above, the present disclosure has the effect of providing the control device for the vehicle that can determine a communication failure with high reliability.

BRIEF DESCRIPTION OF THE DRAWINGS

FIG. 3 is a flowchart showing an example of a flow of a process performed by an engine ECU of the grille shutter control device according to the embodiment.

DETAILED DESCRIPTION

Figure 1:
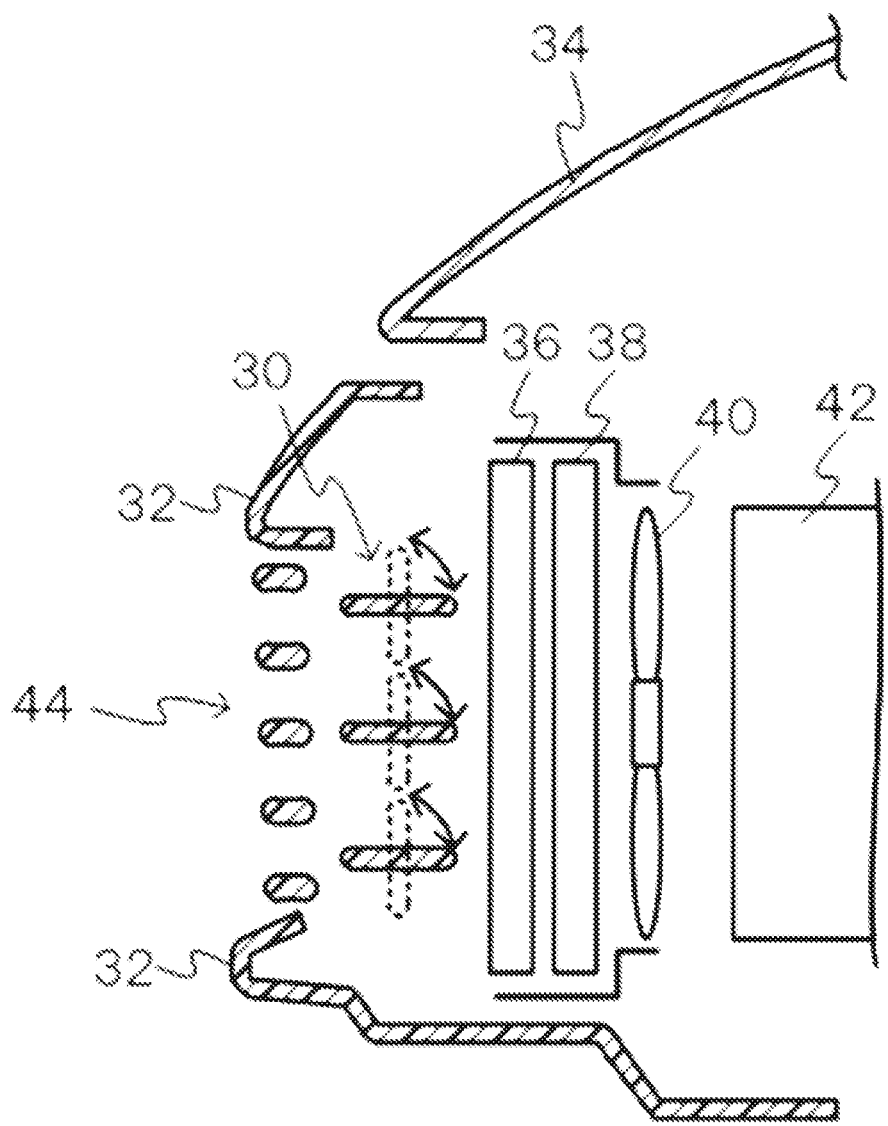
FIG. 1 is a sectional view showing the structure of a car body front portion of a vehicle in which a grille shutter, i.e. a target for control by a grille shutter control device according to an embodiment, is installed.

An example of an embodiment of the present disclosure will be described below in detail with reference to the drawings. This embodiment describes a grille shutter control device, as an example of a control device for a vehicle. FIG. 1 is a sectional view showing the structure of a car body front portion of the vehicle in which a grille shutter, i.e. a target for control by the grille shutter control device according to the embodiment, is installed.

In the car body front portion of the vehicle, a bumper cover 32 and an engine hood 34 are provided. Inside the engine hood 34, a capacitor 36 for air conditioning, a radiator 38 that radiates heat from cooling water, a radiator fan 40, and an engine 42 are installed in this order from the front side of the vehicle.

The bumper cover 32 includes a grille 44. The grille 44 is disposed at the vehicle front side of the capacitor 36 and the radiator 38. By driving the radiator fan 40 disposed at the vehicle rear side of the radiator 38, air is introduced from the grille 44 and sent to the capacitor 36 and the radiator 38.

The grille 44 includes a grille shutter 30 disposed at the vehicle front side of the capacitor 36 and the radiator 38. The grille shutter 30, which is controlled by a grille shutter ECU (electronic control unit) 14 (not shown in FIG. 1, see FIG. 2) described later, is openable and closable, as indicated by arrows in FIG. 1, between an open state (solid lines in FIG. 1) and a closed state (dotted lines in FIG. 1).

Figure 2:
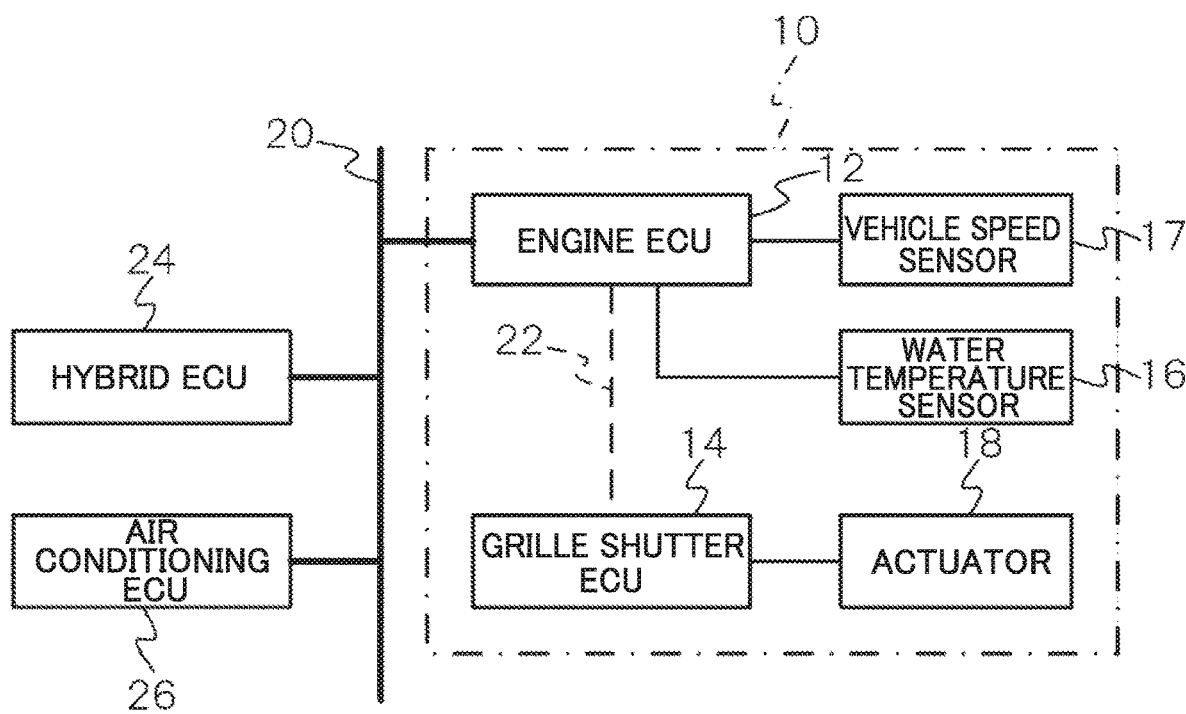
FIG. 2 is a block diagram showing the schematic configuration of the grille shutter control device according to the embodiment.

Next, the configuration of a grille shutter control device 10 according to this embodiment will be described. FIG. 2 is a block diagram showing the schematic configuration of the grille shutter control device 10 according to the embodiment.

The grille shutter control device 10 according to this embodiment includes an engine ECU 12 functioning as a determination unit, a grille shutter ECU 14 functioning as a control unit, a water temperature sensor 16, a vehicle speed sensor 17 functioning as a detection unit, and an actuator 18.

The engine ECU 12 is connected to CAN (controller area network) communication lines 20 of a CAN communication system in the form of a bus network, in which a plurality of ECUs are connected to two common communication lines. The engine ECU 12, in addition to controlling operation of the engine 42 as a drive source of the vehicle, controls opening and closing of the grille shutter 30 through the grille shutter ECU 14. The water temperature sensor 16 that detects the temperature of cooling water, and the vehicle speed sensor 17 that detects a vehicle speed are connected to the engine ECU 12. By way of example, besides the engine ECU 12, a hybrid ECU 24 that controls a hybrid system, an air conditioning ECU 26 that controls an air conditioning unit, and the like are connected to the CAN communication lines 20, so as to send and receive information between the ECUs. Other sensors, except the water temperature sensor 16 and the vehicle speed sensor 17, are connected to the engine ECU 12, but a description thereof is omitted in this embodiment.

To the grille shutter ECU 14, the actuator 18, such as a motor to drive opening and closing of the grille shutter 30, is connected. The grille shutter ECU 14 controls driving of the actuator 18, to control opening and closing of the grille shutter 30.

The engine ECU 12 and the grille shutter ECU 14 are connected through a communication line, i.e. a LIN (local interconnect network) communication line 22, so as to establish communication and send and receive information therebetween through the LIN communication line 22. The LIN network is a multiplex communication network intended for data communication mainly between body system control ECUs, and a bus is arranged on a system-by-system basis. Signals sent and received in the LIN communication can be sent to the CAN communication lines 20 by the ECUs connected to the CAN communication lines 20. The LIN communication line is a single communication line, and transmits digital signals conforming to a specific communication protocol.

To be more specific, the engine ECU 12 commands the grille shutter ECU 14, through the LIN communication, to open or close the grille shutter 30 in accordance with the temperature of water detected by the water temperature sensor 16. The grille shutter ECU 14 controls driving of the actuator 18 in response to the command from the engine ECU 12, to control opening or closing of the grille shutter 30.

The grille shutter ECU 14 may control opening and closing of the grille shutter 30 in response to a command from another ECU, such as the hybrid ECU 24 or the air conditioning ECU 26, in addition to the command from the engine ECU 12.

Note that, the CAN communication adopts a two-line differential voltage method in which data is transmitted by the presence or absence of difference in voltage between two lines (a twist pair). Even if noise enters from outside, since the difference in voltage between the two lines does not change, the effect of the noise on the CAN communication is small. On the other hand, since the LIN communication uses a single line, the LIN communication is easily affected by noise, and easily causes a communication abnormality.

Since the vehicle moves to various locations, in a case where the vehicle moves to a noisy environment, a communication abnormality occurs. For example, in a case where the vehicle is parked under high-voltage electric power lines or the like, an abnormality occurs in the LIN communication owing to noise. In a case where the abnormality occurs in the LIN communication, the abnormality owing to the environmental noise may be mistaken as a failure in the LIN communication.

In this embodiment, in a case where an abnormality is detected in the LIN communication, the engine ECU 12 performs a process to determine a failure in the LIN communication with high reliability. To be more specific, in a case where a predetermined threshold time has elapsed since a start of the vehicle (engine), where cumulative time that a vehicle speed is a predetermined vehicle speed threshold value or more is equal to or more than a cumulative threshold value, and where the number of starts of the vehicle (the number of starts of the engine) is two (two trips) or more, the abnormality is determined to be a failure in the LIN communication. In other words, if a starting time of the vehicle is long, a cumulative time that a vehicle speed is the predetermined vehicle speed threshold value or more is long, and number of trips is large, the vehicle is considered to have already moved from a noisy environment. Therefore, in a case where an abnormality still occurs in the LIN communication, the abnormality can be determined to be a failure in the LIN communication.

A concrete process performed by the engine ECU 12 of the grille shutter control device 10 according to this embodiment, having the above-described configuration, will be described. FIG. 3 is a flowchart showing an example of a flow of the process performed by the engine ECU 12 of the grille shutter control device 10 according to the embodiment.

In step 100, the engine ECU 12 determines whether or not an abnormality is present in the LIN communication. For example, whether or not data reception through the LIN communication line is absent for a predetermined time or more, whether or not data mismatch occurs, or the like is determined. If the determination is YES, the process proceeds to step 102. If the determination is NO, the routine is ended and returned (the process is ended and returned to step 100, or another process is performed).

In step 102, the engine ECU 12 determines whether or not a predetermined threshold time or more has elapsed since a start of the engine. If the determination is YES, the process proceeds to step 104. If the determination is NO, the routine is ended and returned (the process is ended and returned to step 100, or another process is performed).

In step 104, the engine ECU 12 determines whether or not cumulative time that a detection result of the vehicle speed sensor 17 is equal to or more than a predetermined vehicle speed threshold value is equal to or more than a cumulative threshold value. If the determination is YES, the process proceeds to step 106. If the determination is NO, the routine is ended and returned.

In step 106, the engine ECU 12 determines whether or not the number of starts (the number of trips) of the vehicle is equal to or more than a predetermine threshold value. If the determination is YES, the process proceeds to step 108. If the determination is NO, the routine is ended and returned.

In step 108, the engine ECU 12 determines that the LIN communication fails, and the routine is ended and returned. For example, the engine ECU 12 may notify a driver and passengers of the failure in the LIN communication using a flashing alarm lamp that indicates a failure in the LIN communication, or the like.

As described above, in a case where an abnormality is detected in the LIN communication, the engine ECU 12 determines whether or not the abnormality still occurs even if the predetermined conditions (conditions of the starting time of the vehicle, the cumulative time that the vehicle speed is the predetermined vehicle speed threshold value or more, and the number of trips) for considering that the vehicle has already moved from a noisy environment are satisfied. In a case where the abnormality still occurs in the LIN communication even if the conditions for considering that the vehicle has already moved from a noisy environment are satisfied, the engine ECU 12 determines that the abnormality is a failure in the LIN communication. Therefore, an abnormality in the LIN communication owing to environmental noise is prevented from being mistaken as a failure in the LIN communication, thus allowing determination of a communication failure with high reliability.

In the above embodiment, in a case where the predetermined threshold time or more has elapsed since a start of the engine, where cumulative time that a vehicle speed is the predetermined vehicle speed threshold value or more is equal to or more than the cumulative threshold value, and where the number of trips is equal to or more than the threshold value, the engine ECU 12 determines that a failure occurs in the LIN communication, but the present invention is not limited to this. Instead of satisfying the three conditions, for example, in a case where at least one of the conditions that the predetermined threshold time or more has elapsed since a start of the engine, and that cumulative time that a vehicle speed is the predetermined vehicle speed threshold value or more is equal to or more than the cumulative threshold value is satisfied, the engine ECU 12 may determine that a failure occurs in the LIN communication. In other words, at least one of steps 102 and 104 may be performed, while step 106 may be omitted.

In the above embodiment, the engine ECU 12 and the grille shutter ECU 14 are connected through the LIN communication line 22, but the present invention is not limited to this. The present invention may be applied to a case in which in-vehicle equipment, except for the grille shutter ECU 14, and the engine ECU 12 are connected through the LIN communication line. The present invention may be applied to a case in which the engine ECU 12 and the grille shutter ECU 14 are connected through another communication line susceptible to environmental noise, except for the LIN communication.

In the above embodiment, the grille shutter control device 10 is installed in the vehicle that is driven by the engine 42 as a power source, but the present invention is not limited to this. The vehicle may be, for example, a hybrid vehicle, a battery vehicle, a fuel-cell vehicle, or the like.

The process shown in FIG. 3 performed by the engine ECU 12 of the grille shutter control device 10 according to the above embodiment may be a software process performed by execution of a program, or a hardware process performed by hardware. The process may be performed by a combination of software and hardware. In the case of the software process, the program may be stored in various types of recording mediums and distributed.

The present disclosure is not limited to the above description, but, as a matter of course, can be variously modified and performed in a range without departing from the scope of the present invention, in addition to above.

What is claimed is:

1. A control device for use with a vehicle, the control device comprising:
   at least one electronic control unit connected to a Local Interconnect Network (LIN) communication line provided in the vehicle, the at least one electronic control unit being programmed to:
      determine a vehicle start time that has elapsed since a start of the vehicle,
      determine a cumulative time in which a detected vehicle speed is equal to or more than a predetermined vehicle speed threshold value, and
      determine that an abnormality is present in the LIN communication line if: (i) the determined vehicle start time is equal to or more than a predetermined threshold, or (ii) the determined cumulative time is equal to or more than a cumulative threshold value.

2. The control device according to claim 1, wherein the at least one electronic control unit includes a grille shutter electronic control unit that is programmed to control an opening and a closing of a grille shutter for introducing air into a cooling target of the vehicle.

3. A control device for use with a vehicle, the control device comprising:
- at least one electronic control unit connected to a Local Interconnect Network (LIN) communication line provided in the vehicle, the at least one electronic control unit being programmed to:
  - determine a vehicle start time that has elapsed since a start of the vehicle,
  - determine a cumulative time in which a detected vehicle speed is equal to or more than a predetermined vehicle speed threshold value,
  - determine a number of starts of the vehicle, and
  - determine that an abnormality is present in the LIN communication line if:
    - (A) the determined vehicle start time is equal to or more than a predetermined threshold, or the determined cumulative time is equal to or more than a cumulative threshold value, and
    - (B) the determined number of starts of the vehicle is equal to or more than a predetermined threshold value.

4. The control device according to claim 3, wherein the at least one electronic control unit includes a grille shutter electronic control unit that is programmed to control an opening and a closing of a grille shutter for introducing air into a cooling target of the vehicle.

* * * * *